United States Patent
Kim et al.

(10) Patent No.: US 12,537,182 B2
(45) Date of Patent: Jan. 27, 2026

(54) APPARATUS FOR MANUFACTURING ELECTRODE ASSEMBLY, ELECTRODE ASSEMBLY MANUFACTURED THERETHROUGH, AND SECONDARY BATTERY

(71) Applicant: LG ENERGY SOLUTION, LTD., Seoul (KR)

(72) Inventors: Woong Ki Kim, Daejeon (KR); Sang Don Lee, Daejeon (KR); Sang Uk Yeo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 848 days.

(21) Appl. No.: 17/782,026

(22) PCT Filed: Dec. 2, 2020

(86) PCT No.: PCT/KR2020/017449
§ 371 (c)(1),
(2) Date: Jun. 2, 2022

(87) PCT Pub. No.: WO2021/112553
PCT Pub. Date: Jun. 10, 2021

(65) Prior Publication Data
US 2023/0012356 A1 Jan. 12, 2023

(30) Foreign Application Priority Data
Dec. 6, 2019 (KR) .......................... 10-2019-0161927

(51) Int. Cl.
*H01M 4/04* (2006.01)
*H01M 10/04* (2006.01)
*H01M 10/0587* (2010.01)

(52) U.S. Cl.
CPC ..... *H01M 4/0435* (2013.01); *H01M 10/0431* (2013.01); *H01M 10/0587* (2013.01)

(58) Field of Classification Search
CPC .......... H01M 4/0435; H01M 10/0431; H01M 10/0587; H01M 1/065; H01M 10/052;
(Continued)

(56) References Cited

U.S. PATENT DOCUMENTS 2,640,539 A * 6/1953 Newman .............. B26D 1/0006
83/345
3,128,660 A * 4/1964 Gaubert ................... B26D 5/22
83/155

(Continued)

FOREIGN PATENT DOCUMENTS

| CA | 1045969 A | 1/1979 |
|---|---|---|
| CN | 2326004 Y | 6/1999 |

(Continued)

OTHER PUBLICATIONS

Machine translation of Nishihara (JP-2017111864-A). (Year: 2017).*
(Continued)

*Primary Examiner* — Ghassem Alie
(74) *Attorney, Agent, or Firm* — Birch, Stewart, Kolasch & Birch, LLP

(57) ABSTRACT

An apparatus for manufacturing an electrode assembly according to the present invention includes a conveyor configured to allow an electrode to travel; and a cutter configured to cut the traveling electrode to a predetermined size, wherein the cutter comprises: an upper cutting blade disposed above the electrode; an upper eccentric driver configured to eccentrically drive the upper cutting blade; a lower cutting blade disposed below the electrode in a
(Continued)

direction corresponding to the upper cutting blade; and a lower eccentric driver configured to eccentrically drive the lower cutting blade.

13 Claims, 14 Drawing Sheets

(58) Field of Classification Search
CPC .. H01M 10/0404; H01M 4/139; B26D 1/065; B26D 5/08; B26D 2001/0066; B65H 35/0086; B65H 35/06; B65H 20/06; B65H 2861/72; B65H 2406/322; Y02E 60/10; Y02P 70/50
USPC .......................................................... 83/350
See application file for complete search history.

(56) References Cited

U.S. PATENT DOCUMENTS

| | | | | |
|---|---|---|---|---|
| 4,027,564 | A | * 6/1977 | Yahara | B23D 25/08 83/328 |
| 6,555,152 | B1 | * 4/2003 | Roso | A23G 4/04 425/316 |
| 2003/0079591 | A1 | * 5/2003 | Cote | B65H 9/101 83/161 |
| 2006/0096430 | A1 | 5/2006 | Ishihara | |
| 2013/0000454 | A1 | * 1/2013 | Miller | B26D 1/08 83/13 |
| 2013/0244083 | A1 | 9/2013 | Min et al. | |
| 2015/0298338 | A1 | 10/2015 | Yanagi et al. | |

FOREIGN PATENT DOCUMENTS

| | | |
|---|---|---|
| CN | 103662947 A | 3/2014 |
| CN | 104798224 A | 7/2015 |
| CN | 204621207 U | 9/2015 |
| CN | 205033262 U | 2/2016 |
| GB | 1 571 759 A | 7/1980 |
| JP | 2005-254381 A | 9/2005 |
| JP | 2014-61569 A | 4/2014 |
| JP | 2017-111864 A | 6/2017 |
| JP | 2018-26334 A | 2/2018 |
| KR | 20-1983-0000098 Y1 | 2/1983 |
| KR | 10-2006-0027257 A | 3/2006 |
| KR | 20-0450893 Y1 | 11/2010 |
| KR | 10-2012-0060704 A | 6/2012 |
| KR | 10-2012-0111079 A | 10/2012 |
| KR | 10-2013-0087717 A | 8/2013 |
| KR | 10-2013-0102997 A | 9/2013 |
| KR | 10-2014-0009015 A | 1/2014 |
| KR | 10-2014-0015647 A | 2/2014 |
| KR | 10-2014-0018561 A | 2/2014 |
| KR | 2014-20879 A | 2/2014 |
| KR | 2014-186926 A | 10/2014 |
| KR | 10-1575152 B1 | 12/2015 |
| KR | 10-2016-0028900 A | 3/2016 |
| KR | 10-1743873 B1 | 6/2017 |
| KR | 10-1959082 B1 | 3/2019 |

OTHER PUBLICATIONS

Extended European Search Report for European Application No. 20895511.2, dated Apr. 4, 2023.
International Search Report for PCT/KR2020/017449 mailed on Mar. 22, 2021.

* cited by examiner

APPARATUS FOR MANUFACTURING ELECTRODE ASSEMBLY, ELECTRODE ASSEMBLY MANUFACTURED THERETHROUGH, AND SECONDARY BATTERY

CROSS-REFERENCE TO RELATED APPLICATION

The present application claims the benefit of the priority of Korean Patent Application No. 10-2019-0161927, filed on Dec. 6, 2019, which is hereby incorporated by reference in its entirety.

TECHNICAL FIELD

The present invention relates to an apparatus for manufacturing an electrode assembly, an electrode manufactured therethrough, and a secondary battery.

BACKGROUND ART

Secondary batteries are rechargeable unlike primarily batteries, and also, the possibility of compact size and high capacity is high. Thus, recently, many studies on secondary batteries are being carried out.

As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case.

In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

When the electrode assembly according to the related art is manufactured, after the electrode is moved to the cutting part, the cut electrode and the separator are alternately stacked to manufacture the electrode assembly.

Here, there has been a problem in that the cutting part generates vibration during left and right reciprocating driving for speed synchronization.

That is, there is a problem that vibration is generated as stop, acceleration, constant speed, and deceleration sections are repeated, thereby deteriorating electrode position quality after the cutting.

Also, there has been a limit in cutting speed due to inertial moment of a heavy object in an X-axis reciprocating driving manner.

[Prior Art Document] (Patent Document) Korean Patent Publication No. 10-2014-0015647

DISCLOSURE OF THE INVENTION

Technical Problem

One aspect of the present invention is to provide an apparatus for manufacturing an electrode assembly, which is capable of reducing vibration of a cutting part to improve electrode position quality when an electrode is cut, an electrode assembly manufactured therethrough, and a secondary battery.

Another aspect of the present invention is to provide an apparatus for manufacturing an electrode assembly, which is capable of performing high-speed cutting of a cutting part when the electrode is cut, an electrode assembly manufactured therethrough, and a secondary battery.

Technical Solution

An apparatus for manufacturing an electrode assembly according to an embodiment of the present invention comprises a conveyor configured to allow an electrode to travel and a cutter configured to cut the traveling electrode to a predetermined size, wherein the cutter comprises an upper cutting blade disposed above the electrode, an upper eccentric driver configured to eccentrically drive the upper cutting blade, a lower cutting blade disposed below the electrode in a direction corresponding to the upper cutting blade, and a lower eccentric driver configured to eccentrically drive the lower cutting blade.

An electrode assembly according to an embodiment of the present invention may be an electrode assembly manufactured through the apparatus for manufacturing the electrode assembly.

A secondary battery according to an embodiment of the present invention may be a secondary battery comprising the electrode assembly manufactured through the apparatus for manufacturing the electrode assembly.

Advantageous Effects

According to the present invention, when the electrode is cut, the cutting blade may be eccentrically driven to synchronize the speed by the rotation. Therefore, the stop section may be removed to reduce the sudden acceleration and the sudden deceleration, thereby significantly reducing the vibration.

In addition, the cutting blade may continuously travel through the eccentric driving part to increase in cutting speed.

MODE FOR CARRYING OUT THE INVENTION

Figure 1:
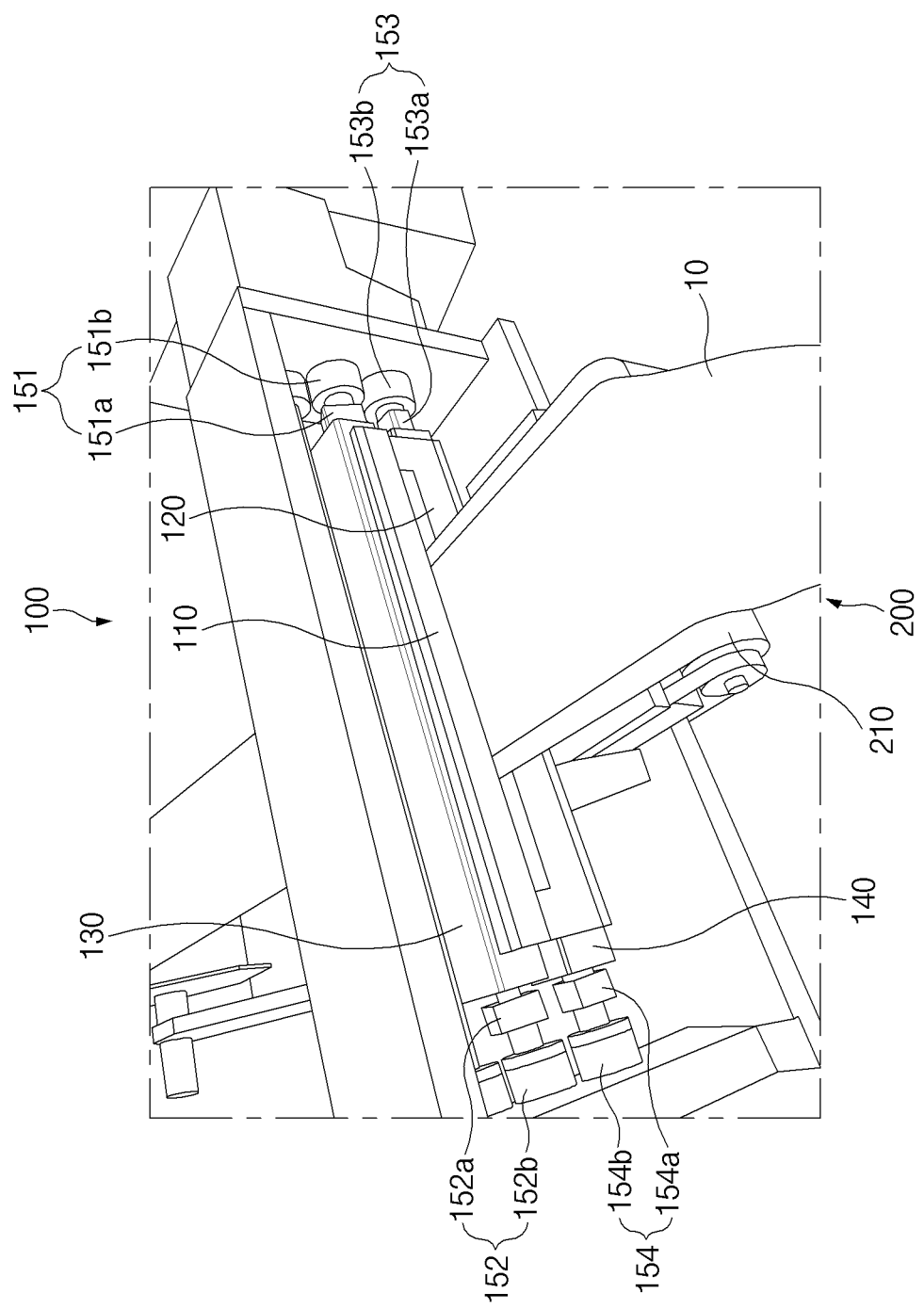
FIG. 1 is a perspective view illustrating an apparatus for manufacturing an electrode assembly according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

One Embodiment

Figure 2:
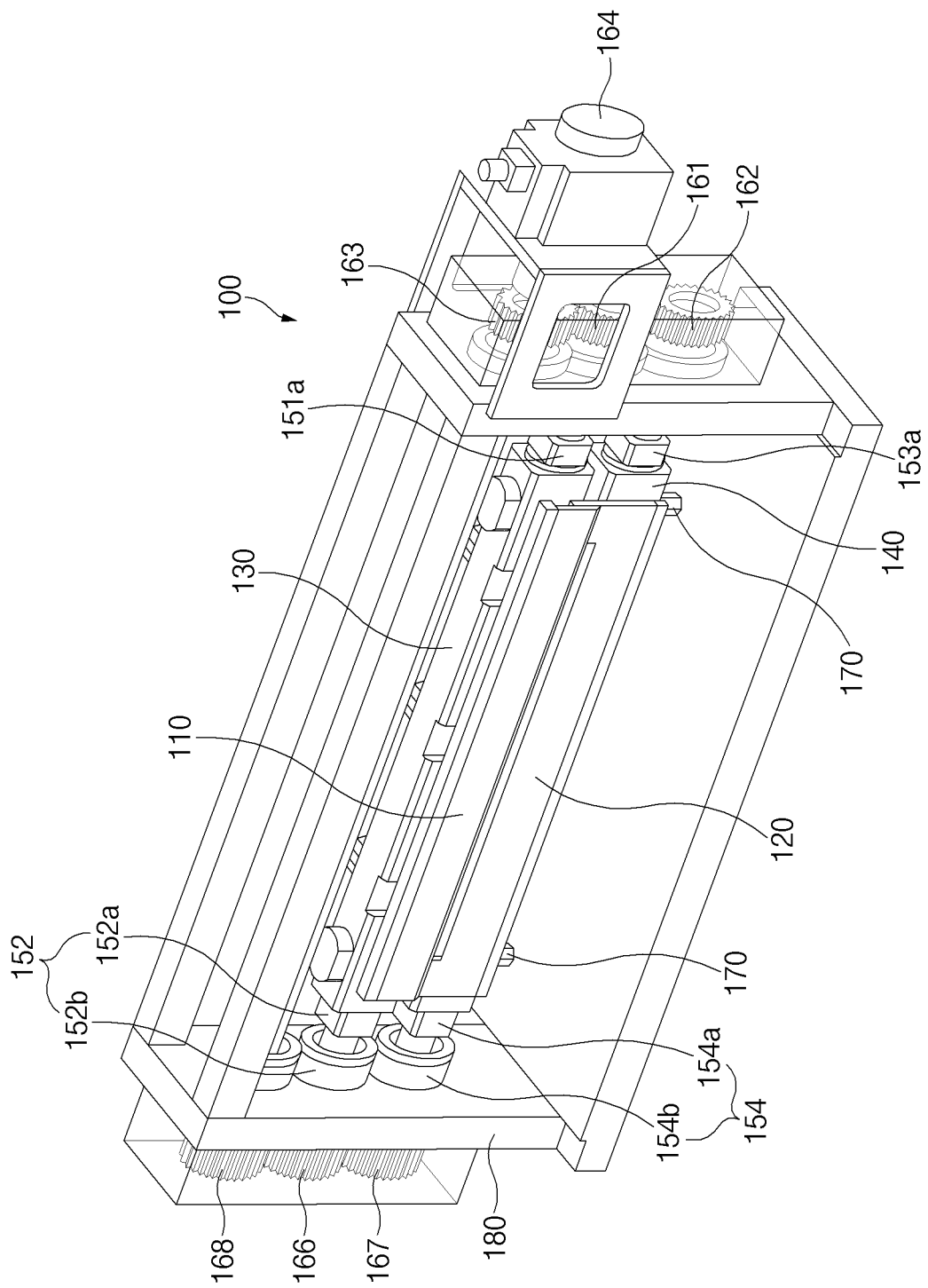
FIG. 2 is a perspective view illustrating a cutting part of the apparatus for manufacturing the electrode assembly according to an embodiment of the present invention.
Figure 3:
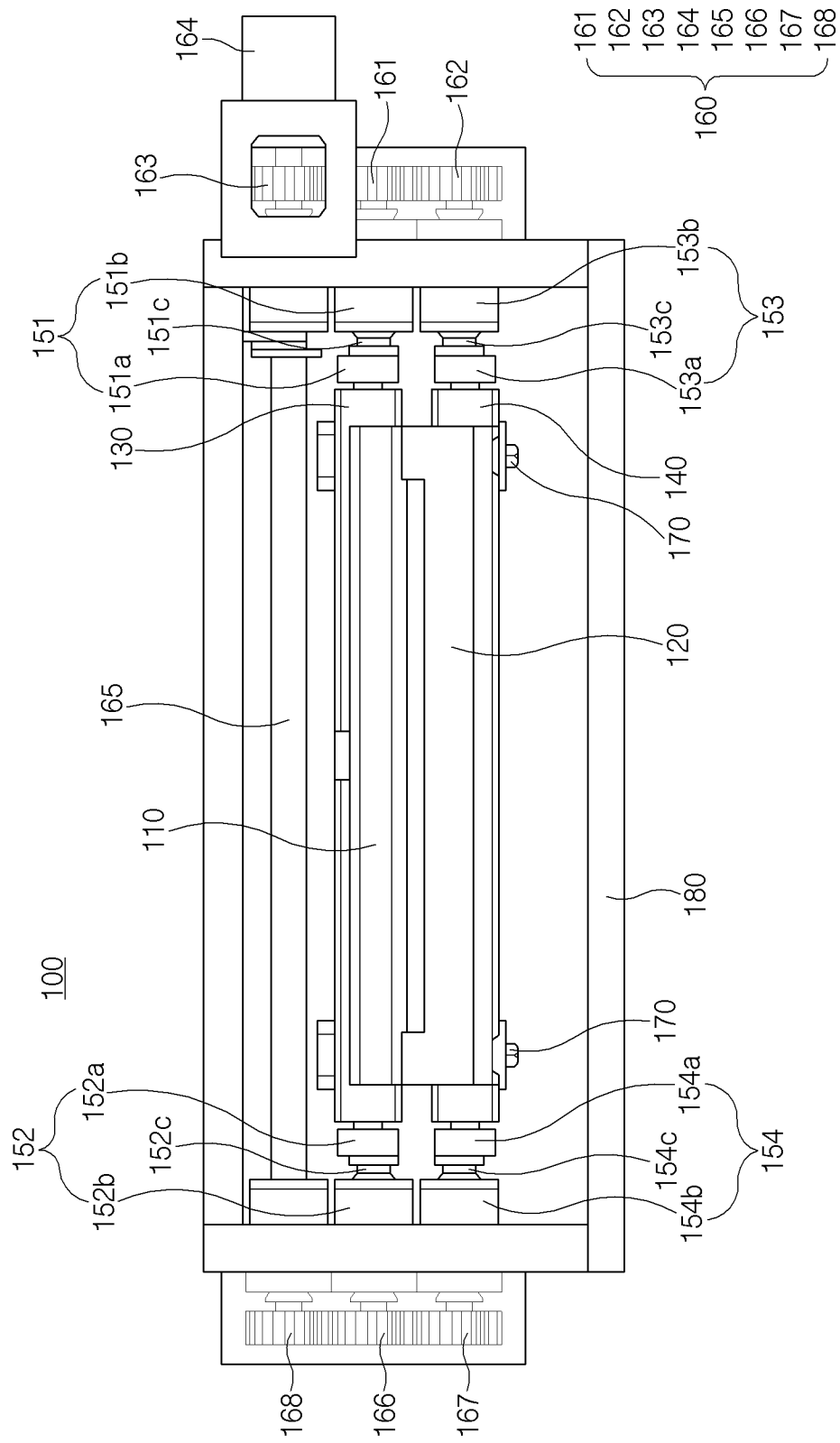
FIG. 3 is a front view illustrating the cutting part of the apparatus for manufacturing the electrode assembly according to an embodiment of the present invention.

FIG. 1 is a perspective view illustrating an apparatus for manufacturing an electrode assembly according to an embodiment of the present invention, FIG. 2 is a perspective view illustrating a cutting part of the apparatus for manufacturing the electrode assembly according to an embodiment of the present invention, and FIG. 3 is a front view illustrating the cutting part of the apparatus for manufacturing the electrode assembly according to an embodiment of the present invention.

Referring to FIGS. 1 to 3, an apparatus for manufacturing an electrode assembly according to an embodiment of the present invention comprises a traveling part 200 for allowing an electrode 10 to travel and a cutting part 100 for cutting the traveling electrode 10 to a predetermined size. The cutting part 100 comprises an upper cutting blade 110 disposed above the electrode 10, upper eccentric driving parts 151 and 152 for eccentrically driving the upper cutting blade 110, a lower cutting blade 120 disposed below the electrode 10 in a direction corresponding to the upper cutting blade 110, and lower eccentric driving parts 153 and 154 for eccentrically driving the lower cutting blade 120.

In more detail, the apparatus for manufacturing the electrode 10 assembly according to an embodiment of the present invention is an apparatus for manufacturing an electrode assembly, in which the electrode 10 and a separator are alternately stacked, by cutting and moving the electrode 10.

Here, the electrode assembly may be a power generation element that is chargeable and dischargeable and be accommodated in a battery case to manufacture a secondary battery.

The electrode 10 may comprise a positive electrode and a negative electrode. Also, each of the separators separates the positive electrode from the negative electrode to electrically insulate the positive electrode from the negative electrode.

The positive electrode may comprise a positive electrode collector and a positive electrode active material applied to the positive electrode collector. For example, the positive electrode collector may be provided as foil made of an aluminum material, and the positive electrode active material may be made of lithium manganese oxide, lithium cobalt oxide, lithium nickel oxide, lithium iron phosphate, or a compound or mixture thereof containing at least one or more of the above-described materials.

The negative electrode may comprise a negative electrode collector and a negative electrode active material applied to the negative electrode collector. For example, the negative electrode collector may be provided as foil made of a copper (Cu) or nickel (Ni) material. The negative electrode active material may comprise synthetic graphite, lithium a metal, a lithium alloy, carbon, petroleum coke, activated carbon, graphite, a silicon compound, a tin compound, a titanium compound, or an alloy thereof. Here, the negative electrode active material may further comprise, for example, non-graphite-based SiO (silica) or SiC (silicon carbide).

The separators may be alternately stacked with respect to the positive electrode and the negative electrode, each of which is made of an insulation material. Each of the separator 114 may be, for example, a multi-layered film produced by microporous polyethylene, polypropylene, or a combination thereof or a polymer film for solid polymer electrolytes or gel-type polymer electrolytes such as polyvinylidene fluoride, polyethylene oxide, polyacrylonitrile, or polyvinylidene fluoride hexafluoropropylene copolymers.

Referring to FIG. 1, the traveling part may allow the electrode 10 to travel.

The traveling part 200 may comprise a conveyor belt 210 to move the electrode 10. The traveling part 200 may be disposed in front of the cutting part 100 with respect to the traveling direction of the electrode 10 or may be disposed in each of front and rear of the cutting part 100.

Figure 4:
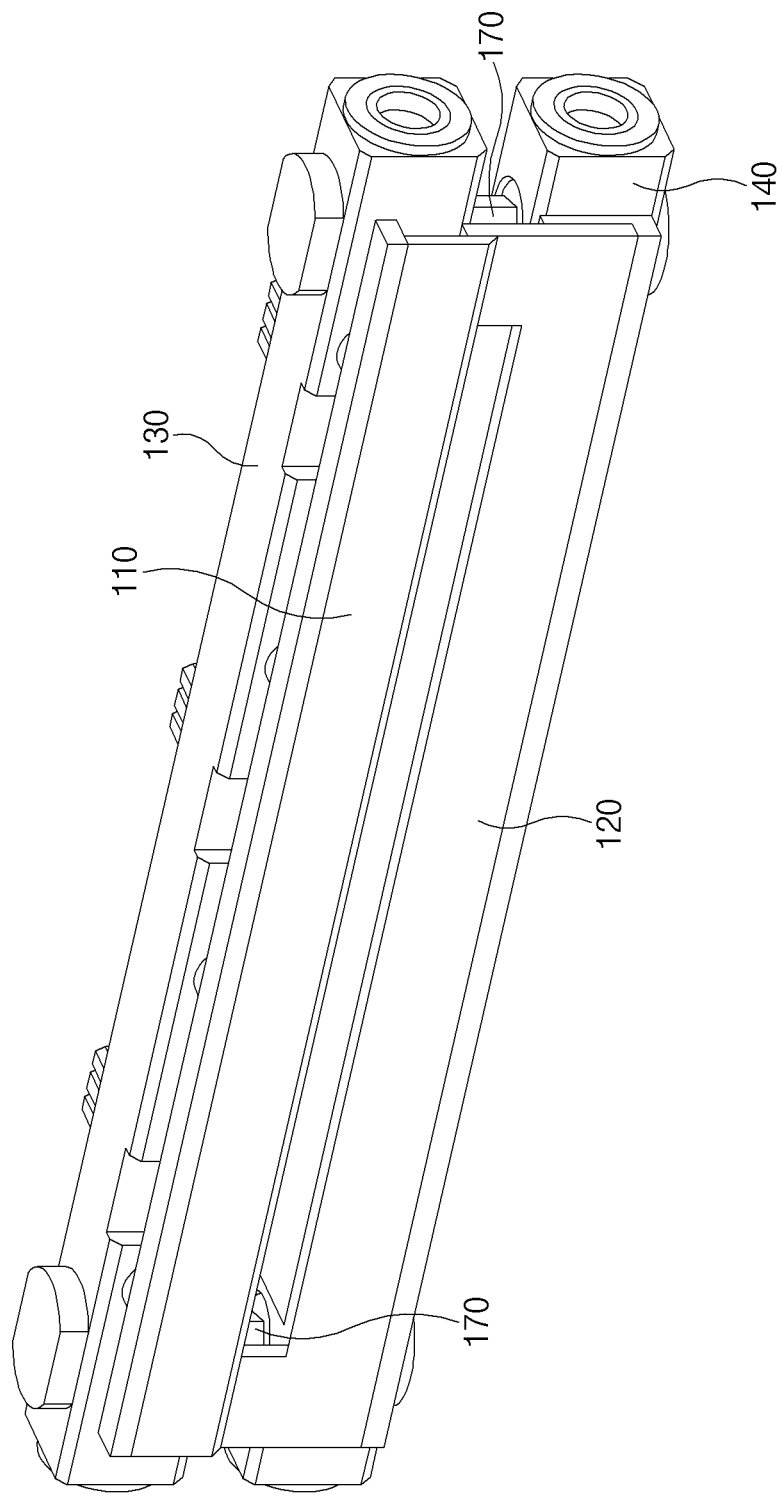
FIG. 4 is a perspective view illustrating a portion of the cutting part of the apparatus for manufacturing the electrode assembly according to an embodiment of the present invention.

FIG. 4 is a perspective view illustrating a portion of the cutting part of the apparatus for manufacturing the electrode assembly according to an embodiment of the present invention.

Referring to FIGS. 1 to 4, the cutting part 100 comprises an upper cutting blade 110 disposed above the electrode 10, upper eccentric driving parts 151 and 152 for eccentrically driving the upper cutting blade 110, a lower cutting blade 120 disposed below the electrode 10 in a direction corresponding to the upper cutting blade 110, and lower eccentric driving parts 153 and 154 for eccentrically driving the lower cutting blade 120.

The cutting part 100 may further comprise an upper mounting block 130 on which the upper cutting blade 110 is mounted, a lower mounting block 140 on which the lower cutting blade 120 is mounted, a guide rod 170 coupled between the upper mounting block 130 and the lower mounting block 140, a power transmission part 160 for transmitting power, and a support frame 180.

An end of the upper cutting blade 110 may have a tapered shape of which a width gradually decreases toward a lower portion thereof.

The upper cutting blade 110 and the lower cutting blade 120 are repeatedly moved in a direction in which the upper cutting blade 110 and the lower cutting blade 120 are away from each other and closer to each other to cut the electrode 10.

When the upper cutting blade 110 and the lower cutting blade 120 are moved in a direction in which the upper cutting blade 110 and the lower cutting blade 120 are closer to each other, the upper cutting blade 110 and the lower cutting blade 120 may be alternated to cross each other.

Figure 5:
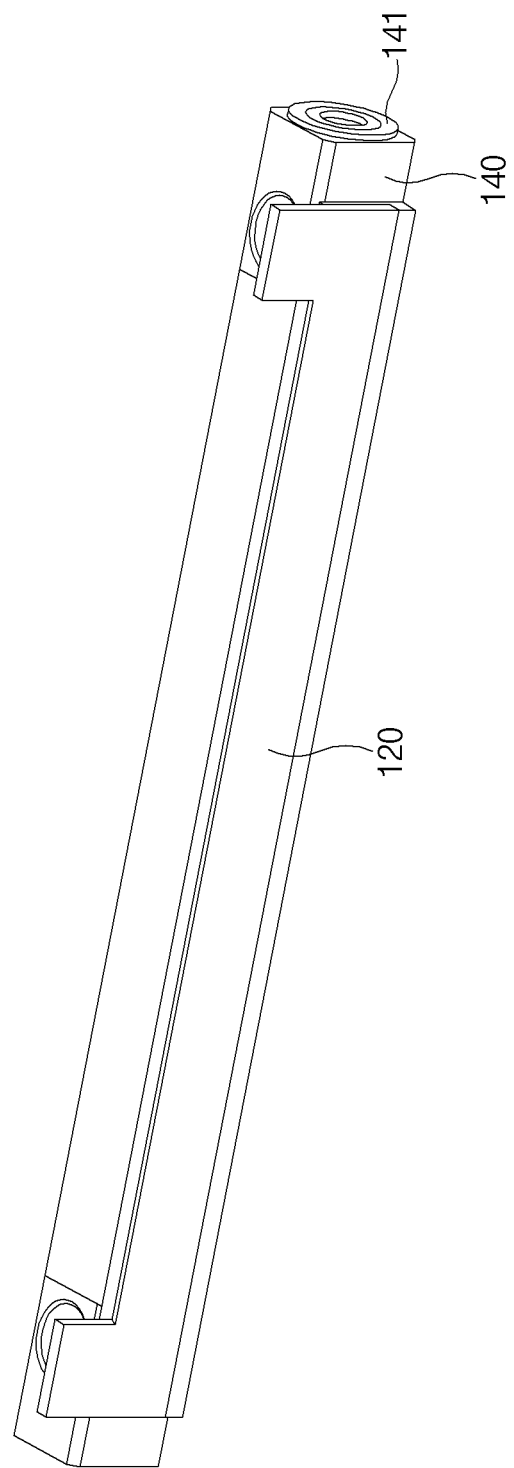
FIG. 5 is a perspective view of a lower mounting block in the cutting part of the apparatus for manufacturing the electrode assembly according to an embodiment of the present invention.
Figure 6:
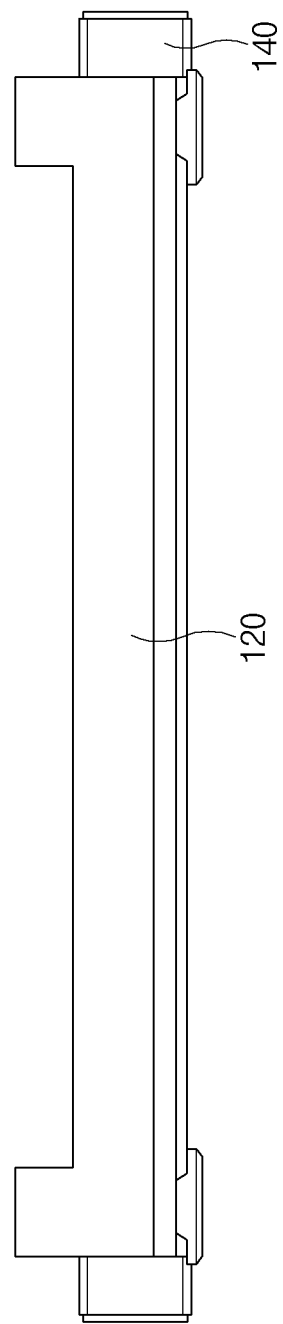
FIG. 6 is a front view of the lower mounting block in the cutting part of the apparatus for manufacturing the electrode assembly according to an embodiment of the present invention.

FIG. 5 is a perspective view of the lower mounting block in the cutting part of the apparatus for manufacturing the electrode assembly according to an embodiment of the present invention, and FIG. 6 is a front view of the lower mounting block in the cutting part of the apparatus for manufacturing the electrode assembly according to an embodiment of the present invention.

Figure 7:
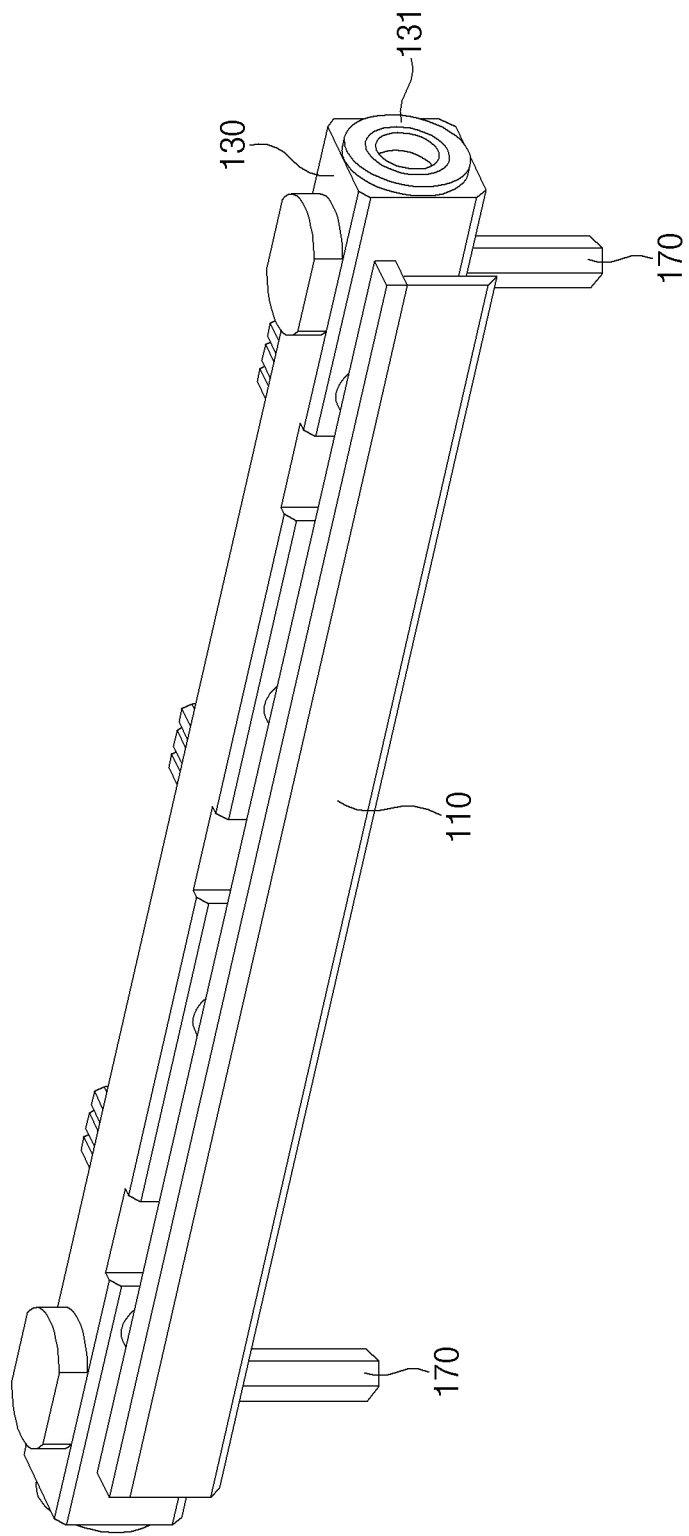
FIG. 7 is a perspective view of an upper mounting block in the cutting part of the apparatus for manufacturing the electrode assembly according to an embodiment of the present invention.
Figure 8:
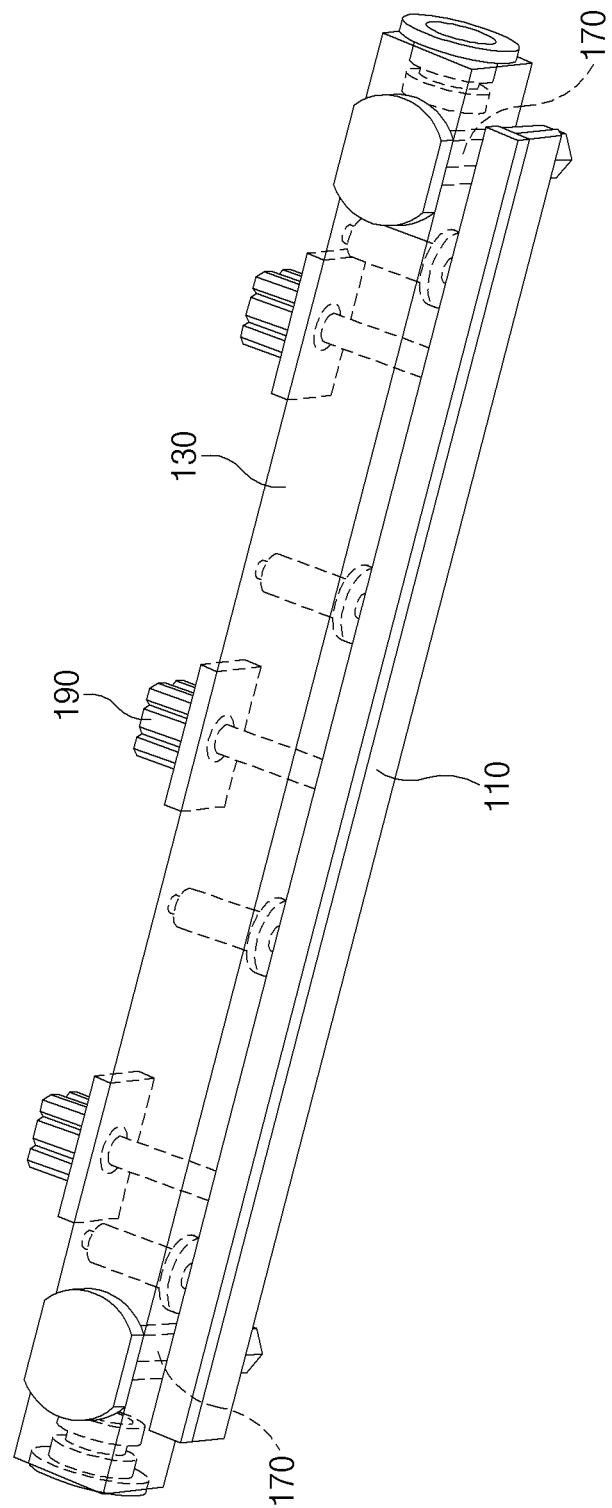
FIG. 8 is a perspective view to see-through the upper mounting block in the cutting part of the apparatus for manufacturing the electrode assembly according to an embodiment of the present invention.
Figure 9:
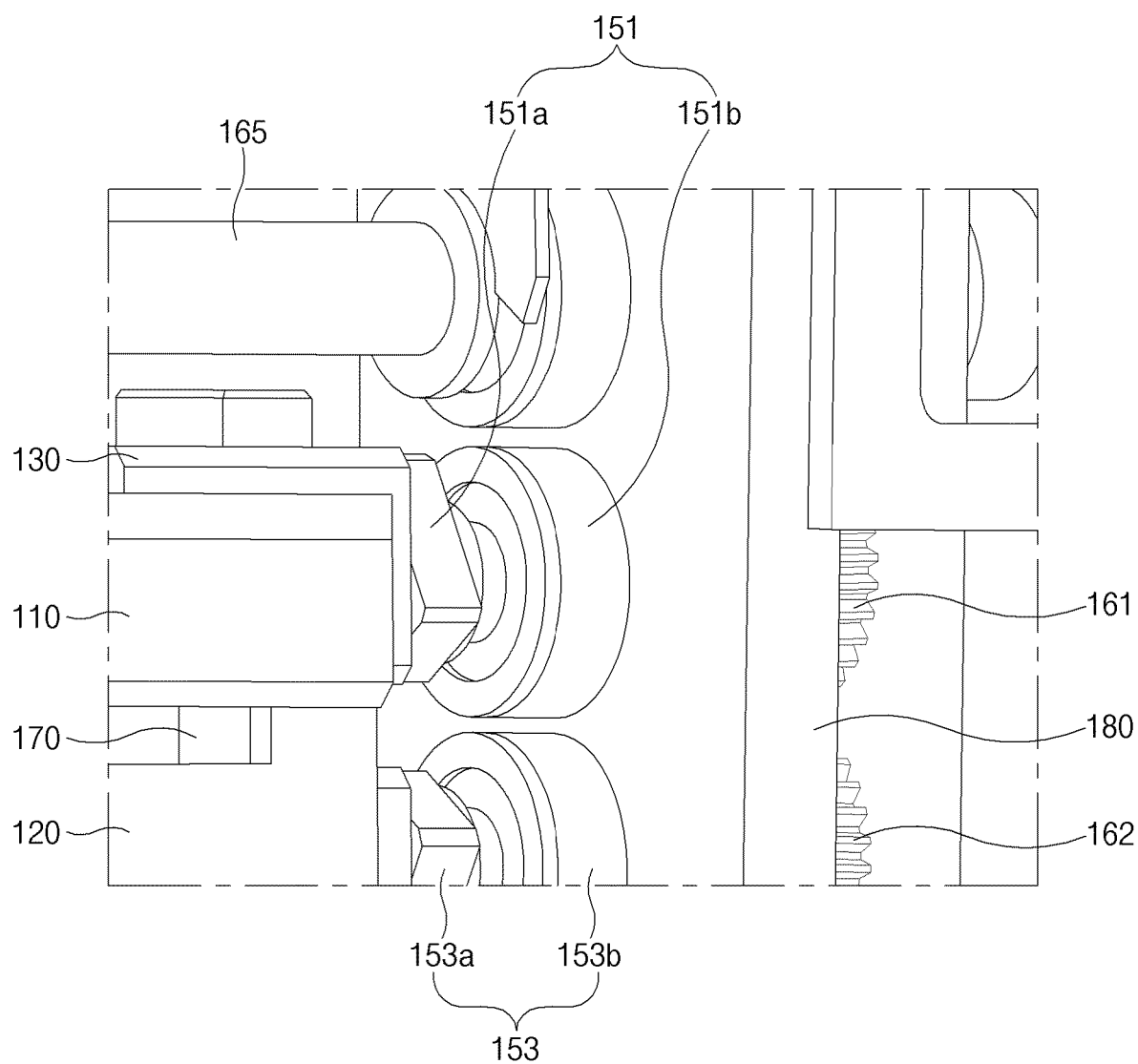
FIG. 9 is a perspective view of an upper eccentric driving part and a lower eccentric driving part in the cutting part of the apparatus for manufacturing the electrode assembly according to an embodiment of the present invention.

FIG. 7 is a perspective view of the upper mounting block in the cutting part of the apparatus for manufacturing the electrode assembly according to an embodiment of the present invention, FIG. 8 is a perspective view to see-through the upper mounting block in the cutting part of the apparatus for manufacturing the electrode assembly according to an embodiment of the present invention, and FIG. 9 is a perspective view of an upper eccentric driving part and a lower eccentric driving part in the cutting part of the apparatus for manufacturing the electrode assembly according to an embodiment of the present invention.

Referring to FIGS. 3 and 5 to 9, the upper mounting block 130 and the lower mounting block 140 may be driven by the upper eccentric driving parts 151 and 152 and the lower eccentric driving parts 153 and 154.

The upper mounting block 130 and the lower mounting block 140 may be eccentrically coupled to the upper eccentric driving parts 151 and 152 and the lower eccentric driving parts 153 and 154 and then be rotated eccentrically.

The cutting part 100 may further comprise a lateral pressure cylinder 190 mounted on the upper mounting block 130. Here, the upper cutting blade 110 may be mounted on a front end of the upper mounting block 130, and the lateral pressure cylinder 190 may adjust a distance between the upper cutting blade 110 and the upper mounting block 130. Thus, it is possible to adjust an intersection point or an intersection distance between the upper cutting blade 110 and the lower cutting blade 120. At this time, the upper cutting blade 110 may be coupled to an end of the lateral pressure cylinder 190. However, the present invention is not necessarily limited thereto, and the upper cutting blade 110 may be directly coupled to the upper mounting block 130.

Figure 10:
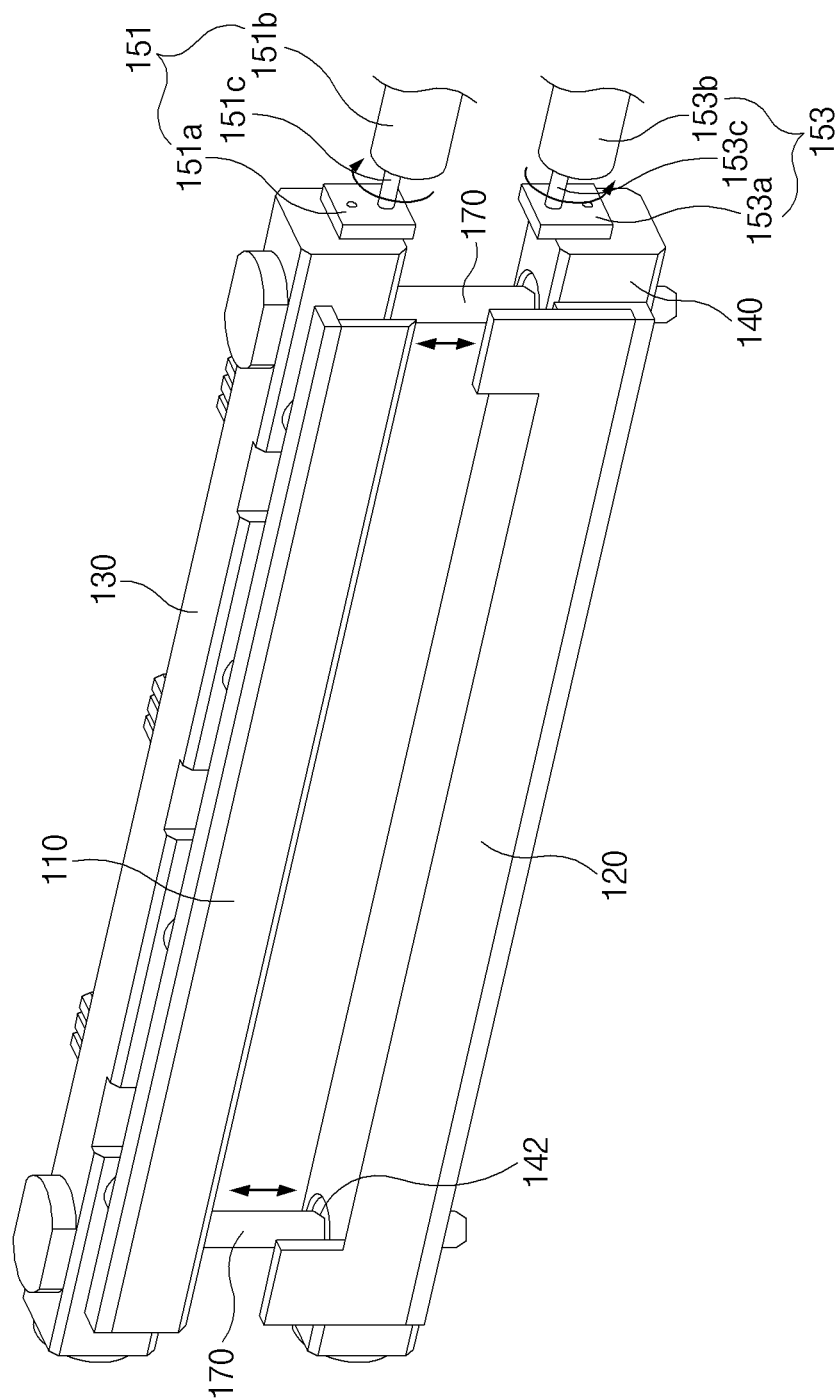
FIG. 10 is a perspective view illustrating an example of a state in which an upper cutting blade and a lower cutting blade are away from each other in the cutting part of the apparatus for manufacturing the electrode assembly according to an embodiment of the present invention.
Figure 11:
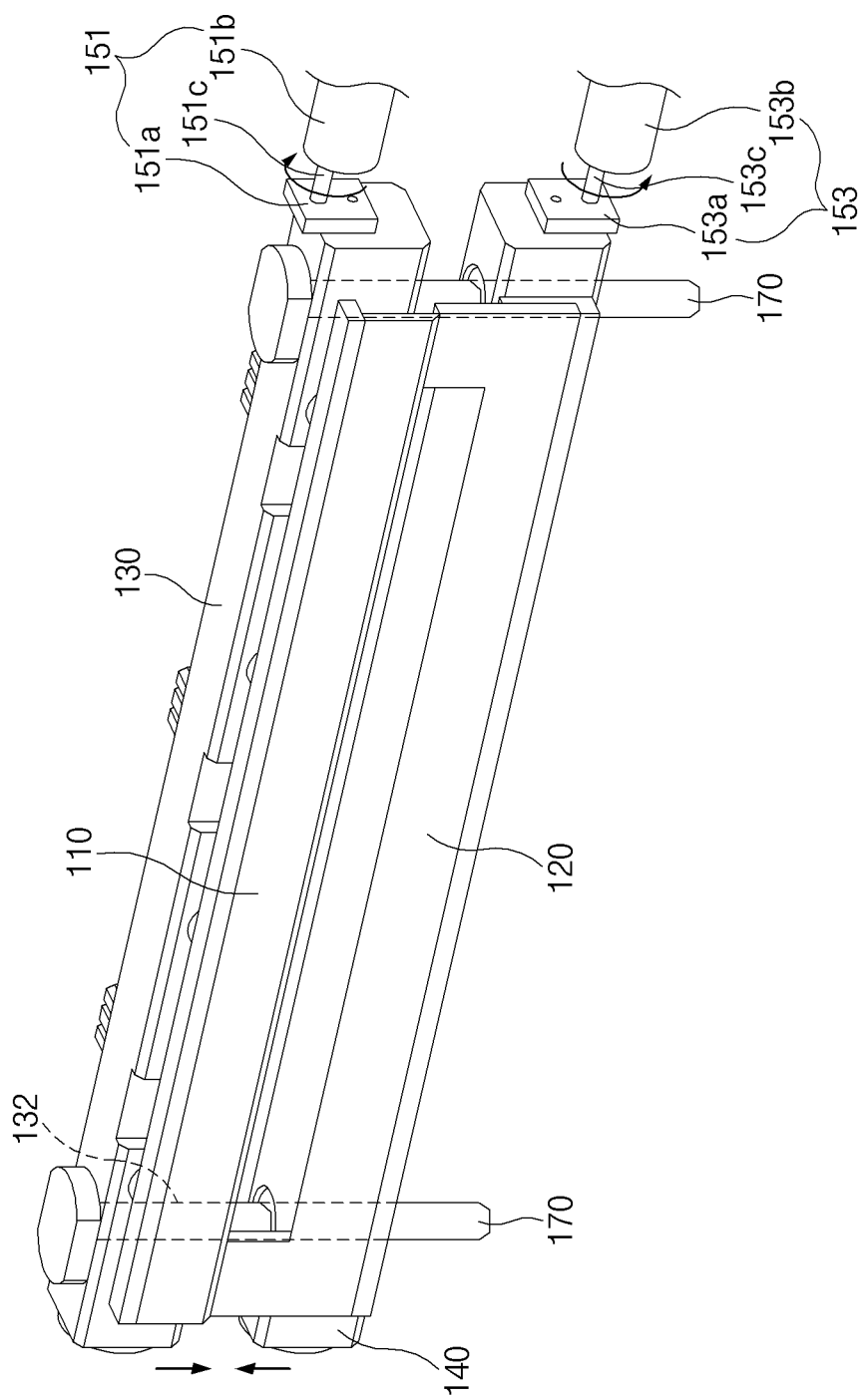
FIG. 11 is a perspective view illustrating an example of a state in which the upper cutting blade and the lower cutting blade are closer to each other in the cutting part of the apparatus for manufacturing the electrode assembly according to an embodiment of the present invention.

FIG. 10 is a perspective view illustrating an example of a state in which the upper cutting blade and the lower cutting blade are away from each other in the cutting part of the apparatus for manufacturing the electrode assembly according to an embodiment of the present invention, and FIG. 11 is a perspective view illustrating an example of a state in which the upper cutting blade and the lower cutting blade are closer to each other in the cutting part of the apparatus for manufacturing the electrode assembly according to an embodiment of the present invention.

Referring to FIGS. 10 and 11, the guide rod 170 may guide the upper mounting block 130 and the lower mounting block 140 to prevent the upper mounting block 130 and the lower mounting block 140 from being rotated, thereby maintaining the direction in which the upper cutting blade 110 and the lower cutting blade 120 face each other.

Referring to FIGS. 3 and 7 to 11, the guide rod 170 is coupled between the upper mounting block 130 and the lower mounting block 140 to guide the movement of the upper mounting block 130 and the lower mounting block 140.

Here, a coupling hole 132 and 142 to which the guide rod 170 is coupled may be formed in each of the upper mounting block 130 and the lower mounting block 140. Thus, when the upper mounting block 130 and the lower mounting block 140 are moved by the upper eccentric driving parts 151 and 152 and the lower eccentric driving parts 153 and 154, the upper mounting block 130 and the lower mounting block 140 may be moved vertically along the guide rod that is inserted into the coupling holes 132 and 142.

Referring to FIGS. 2, 3, 10, and 11, the upper eccentric driving parts 151 and 152 may comprise upper eccentric blocks 151a and 52a coupled to one side of the upper mounting block 130 and upper rotating parts 151b and 152b to which the other sides of the upper eccentric blocks 151a and 152a are coupled, respectively.

The upper eccentric blocks 151a and 152a may be rotated through the upper rotating parts 151b and 152b. At this time, the upper eccentric blocks 151a and 152a may be fixed to the rotation shafts 151c and 152c of the upper rotating parts 151b and 152b. That is, the upper eccentric blocks 151a and 152a may be coupled to the rotation shafts 151c and 152c of the upper rotational parts 151b and 152b so that relative rotational motion with respect to the rotation shafts 151c and 152c of the upper rotational parts 151b and 152b is impossible.

Also, the upper mounting block 130 is coupled to the upper eccentric blocks 151a and 152a so as to be eccentric with respect to the rotation shafts 151c and 152c of the upper rotating parts 151b and 152b. Also, the upper mounting block 130 may be coupled to the upper eccentric blocks 151a and 152a to enable relative rotation with respect to the upper eccentric blocks 151a and 152a.

Here, a bearing 131 is installed on each of side portions of the upper eccentric blocks 151a and 152a so that the upper eccentric blocks 151a and 152a are rotatably coupled. At this time, the bearing 131 may be an angular contact ball bearing having characteristics that are strong against a lateral load (thrust load).

Referring to FIGS. 10 and 11, an operation method may be as follows. First, the rotation shafts 151c and 152c of the upper rotating parts 151b and 152b may be rotated in a clockwise direction. If assuming that the upper cutting blade 110 and the lower cutting blade 120 are the farthest from each other when the rotation shafts 151c and 152c of the upper rotating parts 151b and 152b are rotated at an angle of 180 degrees, when the rotation shafts 151c and 152c of the upper rotating parts 151b and 152b are further rotated at an angle of 180 degrees, the upper cutting blade 110 and the lower cutting blade 120 may be brought to the closest state. When viewed from the side, when the upper rotating parts 151b and 152b are rotated to make one revolution (360 degrees), the upper mounting block 130 may also be eccentric with the rotation shafts 151c and 152c of the upper rotating parts 151b and 152b. Thus, the upper cutting blade 110 mounted on the upper mounting block 130 may be moved up and down in a circle (see FIG. 3).

Since the lower mounting block 140 is moved in synchronization with each other in the same manner as the upper mounting block 130, the upper cutting blade 110 and the lower cutting blade 120 may be moved in a direction in which the upper cutting blade 110 and the lower cutting blade 120 are closer to each other and then may be moved in a direction in which the upper cutting blade 110 and the lower cutting blade 120 are away from each other. Here, this movement may be repeatedly performed.

Referring to FIGS. 2, 3, 10 and 11, more acceleration sections may be secured compared to the same rotation by increasing in eccentric width of the rotation shafts 151c and 152c of the upper mounting block 130 and the upper rotating parts 151b and 152b. That is, an eccentric rotation diameter may increase to secure more acceleration sections compared to the same rotation. Also, the eccentric rotation diameter may increase by 10 mm or more. Here, the eccentric rotation diameter may be formed to be 20 mm. Here, the eccentric rotation diameter between the lower mounting block 140 and the rotation shafts 153c and 154c of the lower rotating parts 153b and 154b may increase to correspond to the increase in diameter.

The lower eccentric driving parts 153 and 154 may comprise lower eccentric blocks 153a and 154a each of which one side is coupled to the lower mounting block 140 and lower rotating parts 153b and 154b to which the other sides of the lower eccentric blocks 153a and 154a are respectively coupled.

The lower eccentric blocks 153a and 154a may be rotated through the lower rotating parts 153b and 154b. At this time, the lower eccentric blocks 153a and 154a may be fixed to the rotation shafts 153c and 154c of the lower rotating parts 153b and 154b.

The lower mounting block 140 may be rotatably coupled to the lower eccentric blocks 153a and 154a so as to be eccentric with respect to the rotation shafts 153c and 154c of the lower rotating parts 153b and 154b. Here, a bearing 141 is installed on each of side portions of the lower eccentric blocks 153a and 154a so that the lower eccentric blocks 153a and 154a are rotatably coupled. At this time, the bearing 141 may be an angular ball bearing.

Referring to FIGS. 10 and 11, an operation method may be as follows. First, the rotation shafts 153c and 154c of the lower rotating parts 153b and 154b may be rotated in a counterclockwise direction. If assuming that the upper cutting blade 110 and the lower cutting blade 120 are the farthest from each other when the rotation shafts 153c and 154c of the lower rotating parts 153b and 154b are rotated at an angle of 180 degrees, when the rotation shafts 153c and 154c of the lower rotating parts 153b and 154b are further rotated at an angle of 180 degrees, the upper cutting blade 110 and the lower cutting blade 120 may be brought to the closest state. When viewed from the side, when the lower rotating parts 153b and 154b are rotated to make one revolution (360 degrees), the lower mounting block 140 may also be eccentric with the rotation shafts 153c and 153c of the lower rotating parts 153b and 153b. Thus, the lower cutting blade 120 mounted on the lower mounting block 140 may be moved up and down in a circle (see FIG. 3).

Since the upper mounting block 130 is moved in synchronization with each other in the same manner as the lower mounting block 140, the upper cutting blade 110 and the lower cutting blade 120 may be moved in a direction in which the upper cutting blade 110 and the lower cutting blade 120 are closer to each other and then may be moved in a direction in which the upper cutting blade 110 and the lower cutting blade 120 are away from each other. Here, this movement may be repeatedly performed.

Referring to FIGS. 2 and 3, the power transmission part 160 may transmit power to the upper eccentric driving parts 151 and 152 and the lower eccentric driving parts 153 and 154.

The power transmission part 160 may comprise upper gears 161 and 166 mounted on the rotation shafts 151c and 152c of the upper rotating parts 151b and 152b, lower gears 162 and 167 mounted on the rotation shafts 153c and 154c of the lower rotating parts 153b and 154b and coupled to be engaged with the upper gears 161 and 166, a power transmission gears 163 and 168 coupled to be engaged with the upper gears 161 and 166, and a power motor 164 for rotating the power transmission gears 163 and 168.

The support frame 180 may support the upper rotating parts 151b and 152b and the lower rotating parts 153b and 154b.

The support frame 180 may be made of a duralumin material (aluminum alloy). Thus, vibration may be minimized by reducing inertial moment. At this time, when the support frame 180 is made of a steel material, the support frame has a weigh of 58 kg, but when the support frame 180 is made of the duralumin material, the weight of the support frame 180 is reduced to 38 kg. That is, the weight was reduced by 34.5%.

Here, the cutting part 100 may be supported by the support frame 180, but the support frame 180 may be separated from other devices and frames other than the cutting part 100 to prevent vibration from being transmitted from other devices other than the cutting part 100.

The upper eccentric driving parts 151 and 152, the lower eccentric driving parts 153 and 154, and the power transmission part 160 may be disposed at both sides of the support frame 180, respectively.

The power transmission part 160 may be mounted at each of both sides of the support frame 180.

The power transmission gears 163 and 168 may comprise a first power transmission gear 163 disposed at one side of the support frame 180 and a second power transmission gear 168 disposed at the other side of the support frame 180.

The first power transmission gear 163 may be coupled to a rotation shaft of the power motor 164.

The second power transmission gear 168 may be coupled through the first power transmission gear 163 and a rotation rod 165, and thus, the first power transmission gear 163 and the second power transmission gear 168 may be co-rotated by the power motor 164.

Referring to FIGS. 2, 3, 10 and 11, an operation of the apparatus for manufacturing the electrode assembly according to an embodiment of the present invention will be described.

As the power transmission gear 168 is rotated, the upper rotating parts 151b and 152b and the lower rotating parts 153b and 154b may be rotated. Also, as the rotation of the upper rotating parts 151b and 152b and the lower rotating parts 153b and 154b, the upper eccentric blocks 151a and 152a and the lower eccentric blocks 153a and 154a may be rotated to move the upper mounting block 130 and the lower mounting block 140. Here, the upper mounting block 130 and the lower mounting block 140 are guided by the guide rod 170 to be moved vertically. At this time, the upper cutting blade 110 and the lower cutting blade 120, which are mounted on the upper mounting block 130 and the lower mounting block 140, may be repeatedly moved in a direction in which the upper cutting blade 110 and the lower cutting blade 120 are away from each other and closer to each other to cut the electrode 10.

Thus, when the electrode 10 is cut through the cutting part 100, the upper cutting blade 110 and the lower cutting blade 120 may be eccentrically driven through the upper eccentric driving parts 151 and 152 and the lower eccentric driving parts 153 and 154 to realize speed synchronization due to the rotation. Therefore, the stop section may be removed to reduce sudden acceleration and the sudden deceleration, thereby significantly reducing the vibration and improving position quality of the electrode.

In addition, the upper cutting blade 110 and the lower cutting blade 120 may continuously travel through the upper eccentric driving parts 151 and 152 and the lower eccentric driving parts 153 and 154 to realize high-speed cutting.

Another Embodiment

Hereinafter, an apparatus for manufacturing an electrode assembly according to another embodiment of the present invention will be described.

Figure 12:
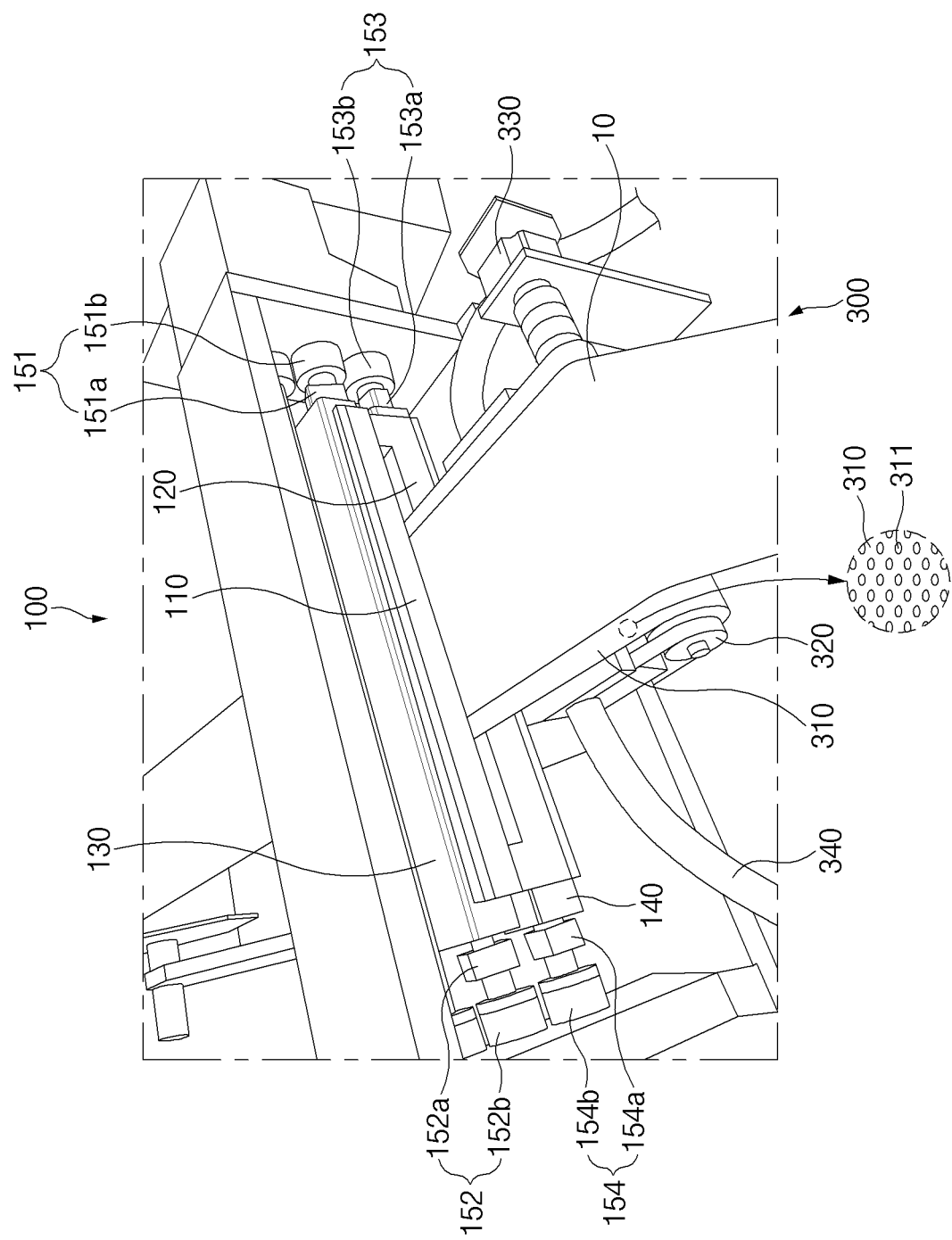
FIG. 12 is a perspective view illustrating an apparatus for manufacturing an electrode assembly according to another embodiment of the present invention.

FIG. 12 is a perspective view illustrating an apparatus for manufacturing an electrode assembly according to another embodiment of the present invention.

Referring to FIG. 12, an apparatus for manufacturing an electrode assembly according to another embodiment of the present invention comprises a traveling part 300 for allowing an electrode 10 to travel and a cutting part 100 for cutting the traveling electrode 10 to a predetermined size. The cutting part 100 comprises an upper cutting blade 110 disposed above the electrode 10, upper eccentric driving parts 151 and 152 for eccentrically driving the upper cutting blade 110, a lower cutting blade 120 disposed below the electrode 10 in a direction corresponding to the upper cutting blade 110, and lower eccentric driving parts 153 and 154 for eccentrically driving the lower cutting blade 120.

When the apparatus for manufacturing the electrode assembly according to another embodiment of the present invention is compared to the apparatus 100 for manufacturing the electrode assembly according to the foregoing embodiment of the present invention, this embodiment is different from the foregoing embodiment in configuration of the traveling part 300. Thus, in the apparatus for manufacturing the electrode assembly according to another embodiment of the present invention, contents duplicated with those of the apparatus for manufacturing the electrode assembly according to the foregoing embodiment and the apparatus for manufacturing the electrode assembly according to another embodiment will be omitted or briefly described, and also, only differences therebetween will be described.

In more detail, the traveling part 300 may allow the electrode 10 to travel.

The traveling part 300 may further comprise a suction belt 310 for vacuum-suctioning the electrode 10 and a traveling means for providing moving force for moving the suction belt 310.

The suction belt 310 may fix the electrode 10 when cutting the electrode 10 in the cutting part 100. Thus, when the electrode 10 is cut, the electrode 10 may be fixed to prevent the electrode 10 from being twisted.

The suction belt 310 may comprise a vacuum suction part 311 that vacuum-suctions the electrode 10.

The vacuum suction part 311 may form a plurality of suction holes to suction air through the suction holes, thereby vacuum-adsorbing and fixing the electrode 10 seated on upper ends of the suction holes.

At this time, the vacuum suction part 311 may be connected to a vacuum suction pipe 340 to suction air through the vacuum suction pipe 340, thereby providing suction power to the vacuum suction part 311.

Here, the apparatus for providing the air suction force through the vacuum suction pipe 340 is a known technique, and thus, a detailed description thereof will be omitted.

Also, the traveling means may comprise a pulley part 320 on which the suction belt 310 is mounted on an outer circumferential surface thereof and a traveling motor 330 that rotates the pulley part 320.

Here, when a rotation shaft of the traveling motor 330 is rotated to rotate the pulley part 320, the suction belt 310 mounted in close contact with the pulley part 320 may be moved.

Figure 13:
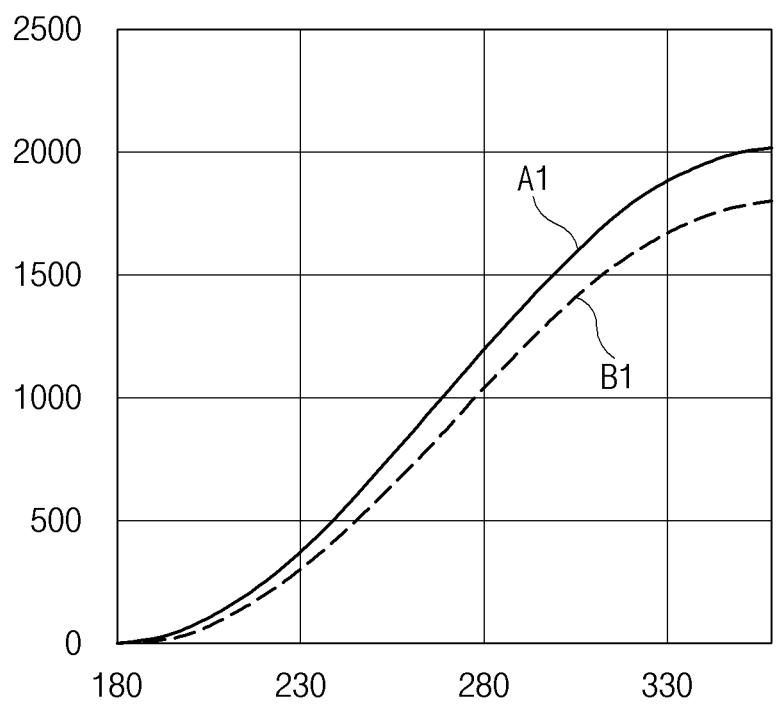
FIG. 13 is a graph illustrating a motor speed deviation of a cutting part of an apparatus for manufacturing an electrode assembly according to the related art.
Figure 14:
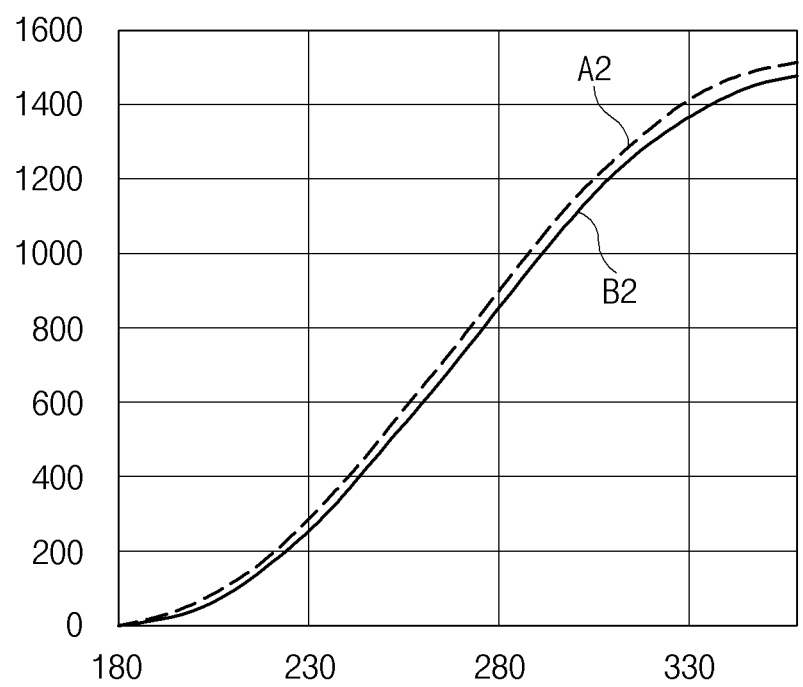
FIG. 14 is a graph illustrating a motor speed deviation of a cutting part of an apparatus for manufacturing an electrode assembly according to an embodiment of the present invention.

FIG. 13 is a graph illustrating a motor speed deviation of a cutting part of an apparatus for manufacturing an electrode assembly according to the related art, and FIG. 14 is a graph illustrating a motor speed deviation of a cutting part of an apparatus for manufacturing an electrode assembly according to an embodiment of the present invention.

FIG. 13 is a graph illustrating a deviation in motor speed of a cutting part of an apparatus for manufacturing an electrode assembly according to the related art, and FIG. 14 is a graph illustrating a deviation in motor speed of a cutting part of an apparatus for manufacturing an electrode assembly according to an embodiment of the present invention. That is, it shows a speed deviation between a theoretical motor RPM (A2) and an actual motor RPM (B2).

Referring to FIG. 13, the theoretical motor RPM (A1) and the actual motor RPM (B1) of the cutting part of the apparatus for manufacturing the electrode assembly according to the related art have a difference of about 200 RPM to about 300 RPM in a 330 minute section of a horizontal axis.

Referring to FIG. 14, the theoretical motor RPM (A2) and the actual motor RPM (B2) of the cutting part of the apparatus for manufacturing the electrode assembly according to an embodiment of the present invention have almost no speed deviation in all sections comprising the 330 minute section of the horizontal axis.

Therefore, when the electrode is cut through the cutting part of the apparatus for manufacturing the electrode assembly according to an embodiment of the present invention, the high-speed cutting may be possible, and it is seen that cutting efficiency and quality are improved as the rapid acceleration is possible when the electrode and the cutting blade collide with each other.

While the present invention has been particularly shown and described with reference to exemplary embodiments thereof, it is to be understood that the scope of the present invention is not limited to the apparatus for manufacturing the electrode assembly according to the present invention. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS

10: Electrode
100: Cutting part
110: Upper cutting blade
120: Lower cutting blade
130: Upper mounting block
131: Bearing 132: Coupling hole
140: Lower mounting block
141: Bearing
142: Coupling hole
151: First upper eccentric driving part
151a: First upper eccentric block
151b: First upper rotating part
151c: Rotation shaft
152: Second upper eccentric driving part
152a: Second upper eccentric block
152b: Second upper rotating part
152c: Rotation shaft
153: First lower eccentric driving part
153a: First lower eccentric block
153b: First lower rotating part
153c: Rotation shaft
154: Second lower eccentric driving part
154a: Second lower eccentric block
154b: Second lower rotating part
154c: Rotation shaft
160: Power transmission part
161: First upper gear
162: First lower gear
163: First power transmission gear
164: Power motor
165: Rotation rod
166: Second upper gear
167: Second lower gear
168: Second power transmission gear
170: Guide rod
180: Support frame
190: Lateral pressure cylinder
200, 300: Traveling part
210: Conveyor belt
310: Suction belt
311: Vacuum suction part
320: Pulley part
330: Traveling motor
340: Vacuum suction pipe

The invention claimed is:

1. An apparatus for manufacturing an electrode assembly, comprising:
a conveyor configured to allow an electrode to travel; and
a cutter configured to cut the traveling electrode to a predetermined size,
wherein the cutter comprises:
an upper cutting blade disposed above the electrode;
an upper eccentric driver configured to eccentrically drive the upper cutting blade;
a lower cutting blade disposed below the electrode in a direction corresponding to the upper cutting blade;
a lower eccentric driver configured to eccentrically drive the lower cutting blade,
an upper mounting block on which the upper cutting blade is mounted; and
a lower mounting block on which the lower cutting blade is mounted,
wherein the upper mounting block and the lower mounting block are driven by the upper eccentric driver and the lower eccentric driver, respectively,
wherein the upper eccentric driver comprises:
an upper eccentric block of which a first side is coupled to the upper mounting block; and
an upper rotating part to which a second side of the upper eccentric block is coupled,
wherein the upper eccentric block is rotated through the upper rotating part,
wherein the upper mounting block is rotatably coupled to the upper eccentric block so as to be eccentric with respect to a rotation shaft of the upper rotating part,
wherein the lower eccentric driver comprises:
a lower eccentric block of which a first side is coupled to the lower mounting block; and
a lower rotating part to which a second side of the lower eccentric block is coupled,
wherein the lower eccentric block is rotated through the lower rotating part, and
wherein the lower mounting block is rotatably coupled to the lower eccentric block so as to be eccentric with respect to a rotation shaft of the lower rotating part.

2. The apparatus of claim 1, wherein the upper cutting blade and the lower cutting blade are repeatedly moved in a direction, in which the upper cutting blade and the lower cutting blade are closer to each other and away from each other, to cut the electrode.

3. The apparatus of claim 2, wherein the upper cutting blade and the lower cutting blade are alternated to cross each other in the direction in which the upper cutting blade and the lower cutting blade are closer to each other.

4. The apparatus of claim 3, wherein an end of the upper cutting blade has a tapered shape of which a width gradually decreases toward a lower portion thereof so that the electrode is cut.

5. The apparatus of claim 1, wherein the upper mounting block and the lower mounting block are eccentrically coupled to the upper eccentric driver and the lower eccentric driver so as to be eccentrically rotated.

6. The apparatus of claim 5, wherein the cutter further comprises a guide rod coupled between the upper mounting block and the lower mounting block,
wherein the guide rod guides the upper mounting block and the lower mounting block so as not to be rotated so that the upper cutting blade and the lower cutting blade are maintained in a direction facing each other.

7. The apparatus of claim 6, wherein a coupling hole to which the guide rod is coupled is formed in each of the upper mounting block and the lower mounting block, and
wherein the upper mounting block and the lower mounting block are moved vertically along the guide rod when the upper mounting block and the lower mounting block are moved by the upper eccentric driver and the lower eccentric driver.

8. The apparatus of claim 1, wherein the cutter further comprises a power transmission configured to transmit power to the upper eccentric driver and the lower eccentric driver, wherein the power transmission comprises:
an upper gear mounted on the rotation shaft of the upper rotating part;
a lower gear mounted on the rotation shaft of the lower rotating part and coupled to be engaged with the upper gear;
a power transmission gear coupled to engaged with the upper gear; and
a power motor configured to rotate the power transmission gear.

9. The apparatus of claim 8, wherein the cutter further comprises a support frame configured to support the upper rotating part and the lower rotating part,
wherein the upper eccentric driver, the lower eccentric driver, and the power transmission are disposed at each of both sides of the support frame, and wherein the power transmission is mounted on each of both the sides of the support frame.

10. The apparatus of claim 9, wherein the power transmission gear comprises a first power transmission gear disposed at a first side of the support frame and a second power transmission gear disposed at a second side of the support frame,
wherein the first power transmission gear is coupled to a rotation shaft of the power motor, and
wherein the second power transmission gear is coupled to the first power transmission gear through a rotation rod so that the first power transmission gear and the second power transmission gear are co-rotated by the power motor.

11. The apparatus of claim 1, wherein the conveyor comprises a suction belt configured to vacuum-suction the electrode so as to move the electrode, and wherein the suction belt fixes the electrode when the electrode is cut in the cutter.

12. An electrode assembly manufactured through the apparatus for manufacturing the electrode assembly of claim 1.

13. A secondary battery comprising the electrode assembly of claim 12.

* * * * *